(12) United States Patent
Shen

(10) Patent No.: US 8,020,255 B2
(45) Date of Patent: Sep. 20, 2011

(54) HINGE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 406 days.

(21) Appl. No.: 12/331,405

(22) Filed: Dec. 9, 2008

(65) Prior Publication Data

US 2010/0050381 A1    Mar. 4, 2010

(30) Foreign Application Priority Data

Aug. 29, 2008  (CN) .................... 2008 2 0301976 U

(51) Int. Cl.
*E05C 17/64* (2006.01)

(52) U.S. Cl. ................. 16/340; 16/330; 16/337

(58) Field of Classification Search ............ 16/337–339, 16/342, 330, 303, 374, 376, 377, 340; 361/679.11, 361/679.12, 679.27; 455/90.3, 575.1, 575.3, 455/575.8; 379/433.12, 433.13; 348/373, 348/333.01, 333.06, 794

See application file for complete search history.

(56) References Cited

U.S. PATENT DOCUMENTS

| | | | |
|---|---|---|---|
| 7,533,446 B1 * | 5/2009 | Lin ................................. | 16/330 |
| 2007/0169312 A1 * | 7/2007 | Ho et al. ........................ | 16/330 |
| 2009/0158556 A1 * | 6/2009 | Chang et al. .................. | 16/330 |
| 2009/0193624 A1 * | 8/2009 | Sue et al. ....................... | 16/386 |
| 2009/0229079 A1 * | 9/2009 | Su .................................. | 16/274 |
| 2009/0320243 A1 * | 12/2009 | Wang et al. .................... | 16/303 |
| 2010/0000048 A1 * | 1/2010 | Chang ............................ | 16/337 |
| 2010/0000370 A1 * | 1/2010 | Chang ............................ | 74/567 |
| 2010/0043176 A1 * | 2/2010 | Chiang .......................... | 16/386 |

* cited by examiner

*Primary Examiner* — Chuck Y. Mah
(74) *Attorney, Agent, or Firm* — Altis Law Group, Inc.

(57) ABSTRACT

A hinge includes a rack, a shaft, and an interfering assembly. The interfering assembly includes a first interfering member fixed to the rack, and a second interfering member capable of rotating with the shaft. The first interfering member includes a first end surface. A first tab is formed on the first end surface. Each of two opposite ends of the first tab forms a first slope surface. The second interfering member includes a second end surface. A first recess is defined in the second end surface for receiving the first tab therein. Each of two opposite ends of recess forms a second slope surface. The shaft rotates with respect to the rack. One of the first slope surfaces of the first tab is able to engage with a corresponding one of the two second slope surfaces of the first recess to guide the first tab sliding into the first recess.

17 Claims, 4 Drawing Sheets

HINGE

CROSS-REFERENCE TO RELATED APPLICATIONS

Relevant subject matter is disclosed in co-pending U.S. patent applications (application Ser. No. 12/205,931, filed on Sep. 8, 2008 and entitled "HINGE AND INTERFERENCE APPARATUS FOR THE SAME;" and application Ser. No. 12/202,331, filed on Sep. 1, 2008 and entitled "HINGE AND INTERFERENCE APPARATUS FOR THE SAME"), which are assigned to the same assignee as this patent application. The disclosure of the co-pending applications is incorporated herein by references.

BACKGROUND

1. Technical Field

The disclosure relates to mechanical structures and, particularly, to a hinge.

2. Description of Related Art

A collapsible device, such as a notebook computer or a clamshell mobile phone, generally includes two parts pivotally connected via a hinge. The hinge generally includes a bracket mounted to one part and a shaft with a first end mounted to the other part. The bracket includes a barrel rotatably receiving a second end of the shaft. Washers and resilient assembly are retained around the shaft. The resilient assembly causes the washers resisting against the bracket and the shaft to increase friction when the hinge rotates, thereby positioning one part of the collapsible device with respect to the other part of the collapsible device at desired angles. However, the collapsible device using such a hinge can not be automatically and completely closed.

Therefore, the present disclosure provides a hinge to obviate the described limitations.

DETAILED DESCRIPTION

Figure 1:
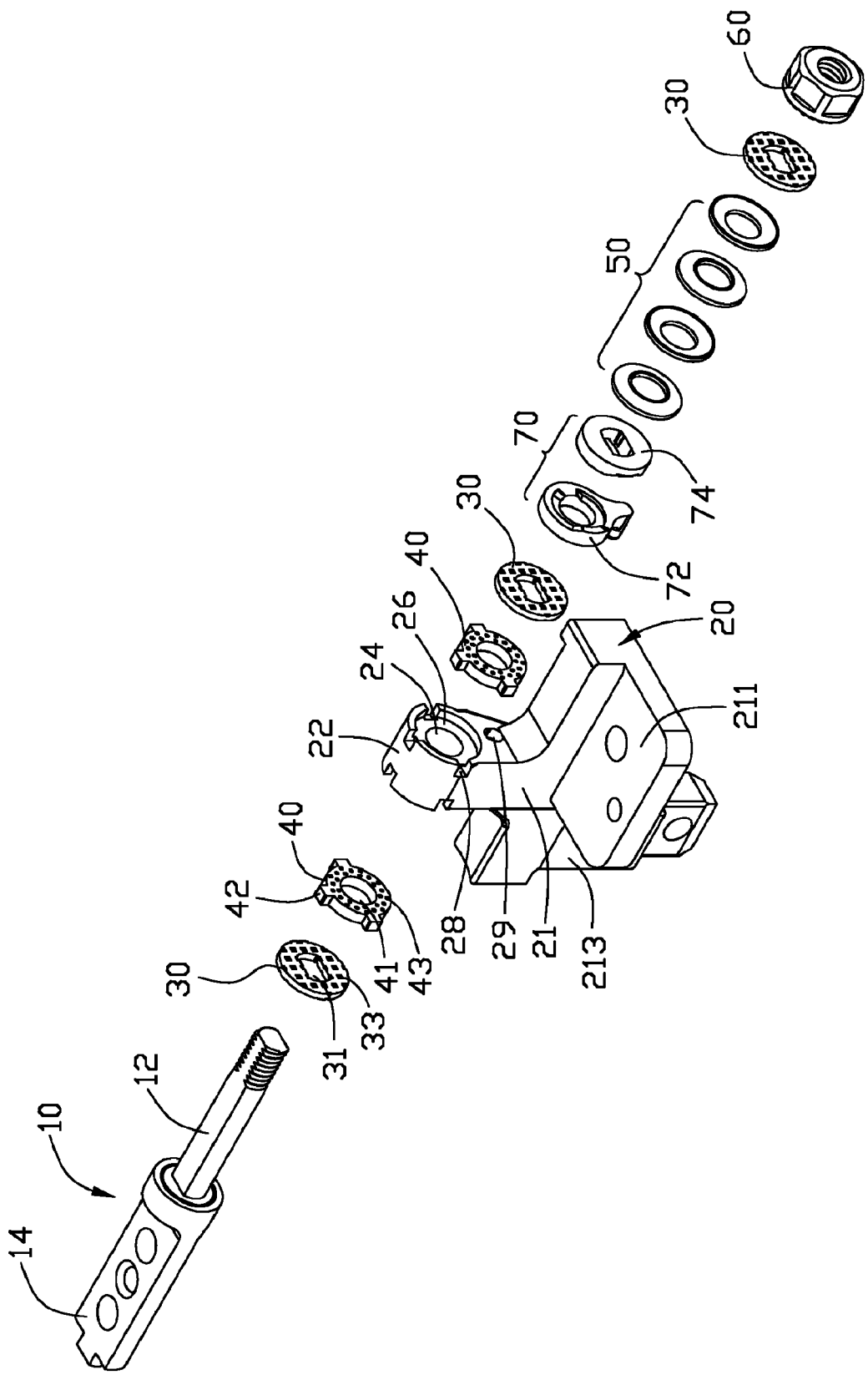
FIG. 1 is an exploded, isometric view of an exemplary embodiment of a hinge, the hinge including an interfering assembly.
Figure 2:
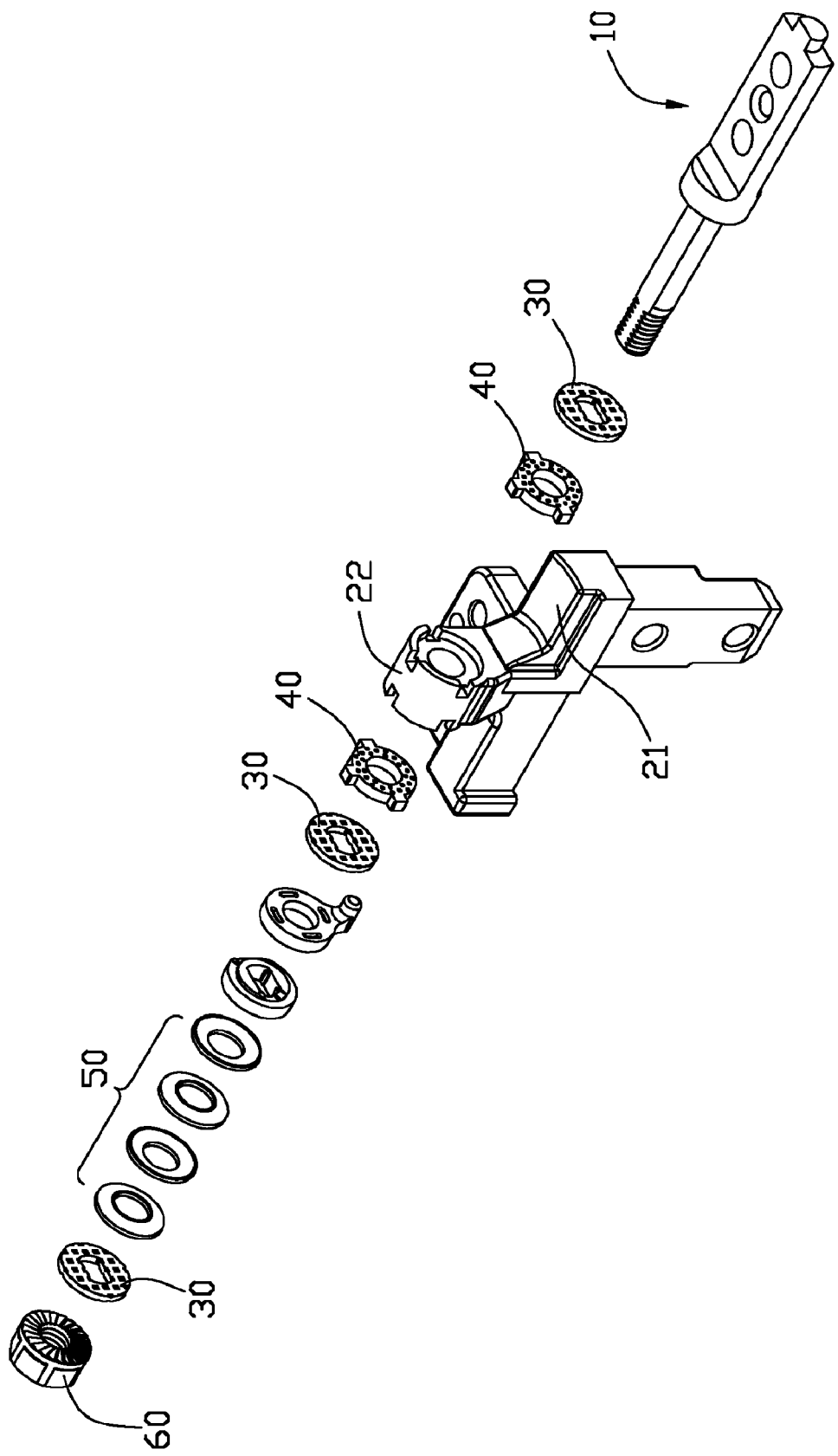
FIG. 2 is another exploded, isometric view of the hinge of FIG. 1, but viewed from a different perspective.

Referring to FIGS. 1 and 2, an exemplary embodiment of a hinge is adapted to be mounted to a collapsible device, such as a notebook computer or a clamshell mobile phone, that includes two parts rotatably connected to each other via the hinge. The hinge includes a shaft 10, a rack 20, three washers 30, two friction pieces 40, an interfering assembly 70, a resilient assembly 50, and a fastener 60.

The shaft 10 includes a post 12, and a fixed portion 14 extending from a first end of the post 12 for fixing the shaft 10 to one part of the collapsible device. The shaft 10 has a noncircular, such as double-D shaped in the instant embodiment, cross section. A second end of the post 12 forms a threaded portion.

The rack 20 includes a main body 21 and an engaging portion 22 connected with the main body 21. The main body 21 includes a horizontal mounting portion 211 and a vertical inserting portion 213 for fixing the rack 20 to the other part of the collapsible device. Opposite ends of the engaging portion 22 defines two receiving rooms 26. A pivoting hole 24 is defined in the engaging portion 22 and located between the receiving rooms 26 to communicate the receiving rooms 26. Three cutouts 28 are defined in a circumference of each end of the engaging portion 22, communicating with a corresponding receiving room 26. The engaging portion 22 also defines a positioning hole 29 adjacent to the main body 21.

Each washer 30 defines a double-D shaped through hole 31 for snugly fitting about the post 12. Opposite sides of each washer 30 define a plurality of receiving holes 33 for retaining lubricant.

The friction pieces 40 are located in the corresponding receiving rooms 26 of the engaging portion 22. Each friction piece 40 defines a through hole 41 for rotatably receiving the post 12. Three blocks 42 are formed on a circumference of each friction piece 40 corresponding to the three cutouts 28 at a corresponding end of the engaging portion 22. Opposite sides of each friction piece 40 define a plurality of receiving holes 43 for retaining lubricant.

Figure 3:
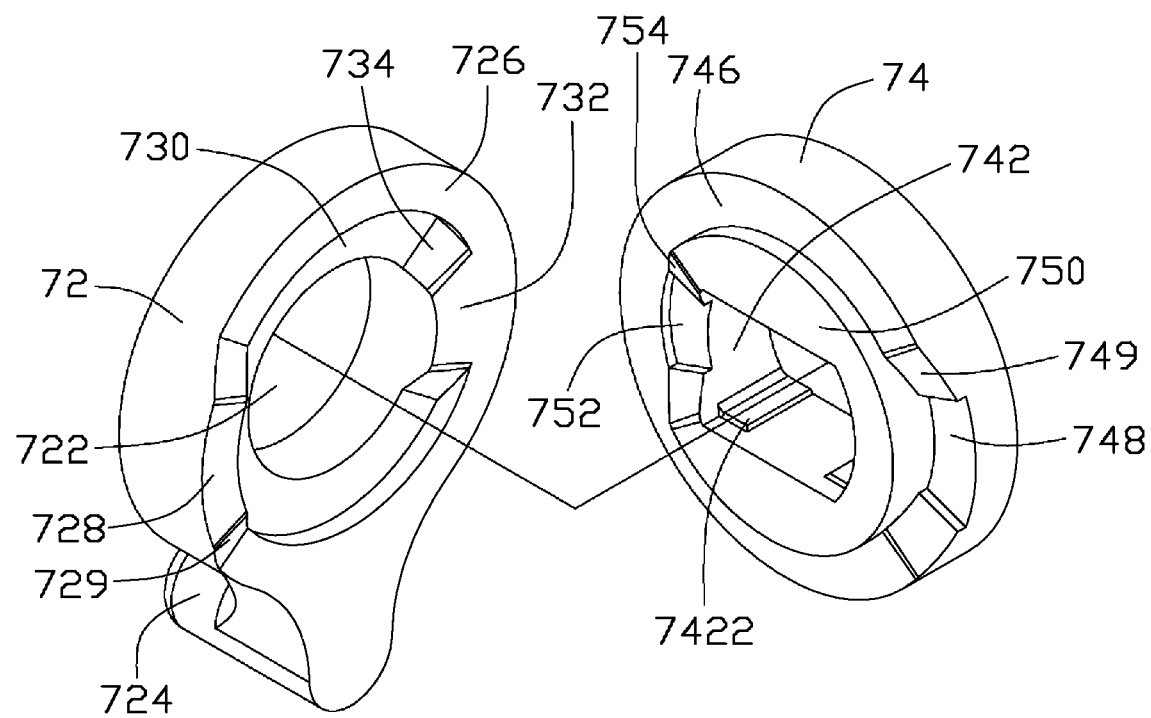
FIG. 3 is an exploded, isometric view of the interference assembly of FIG. 1.
Figure 4:
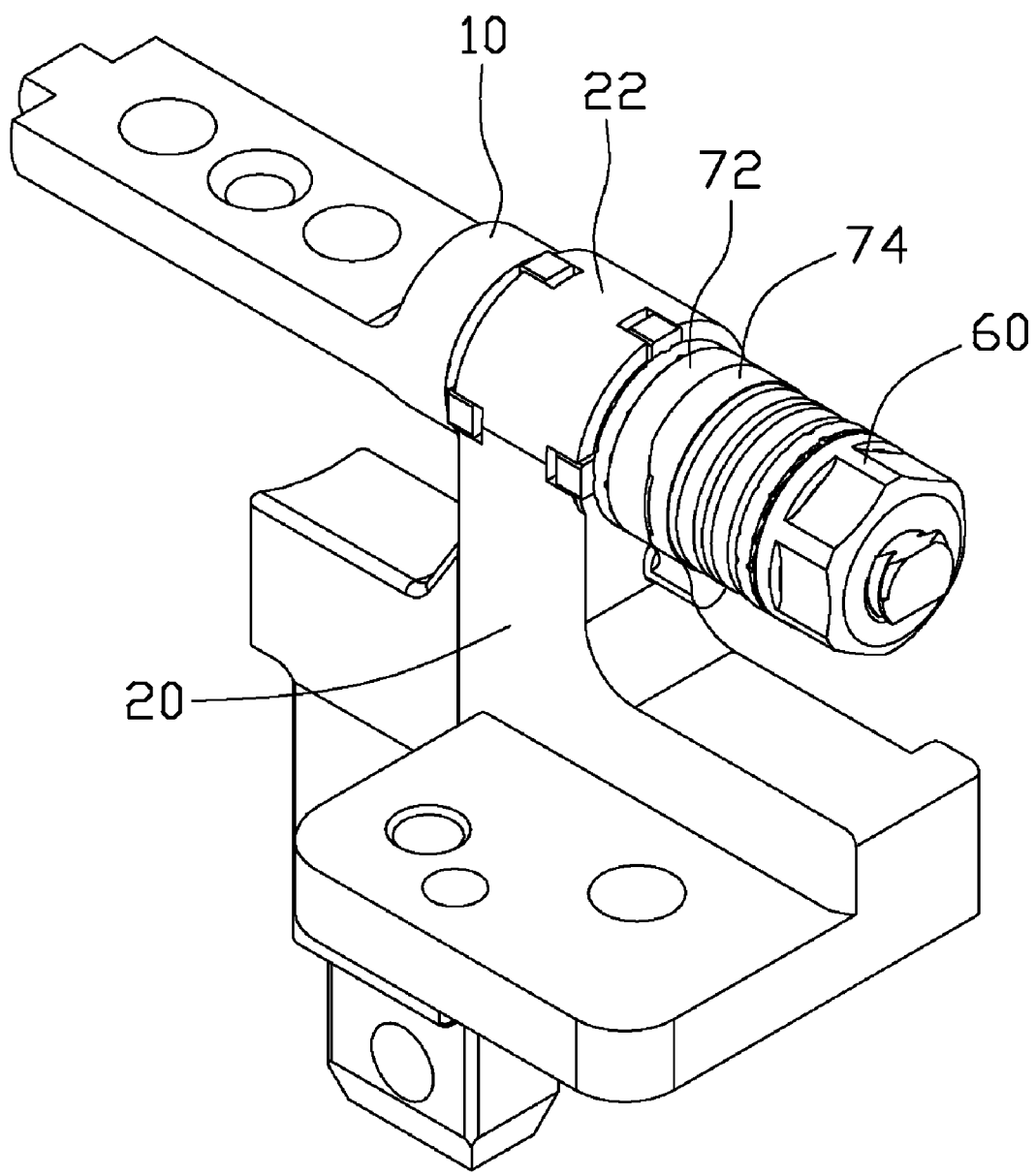
FIG. 4 is an assembled, isometric view of the hinge of FIG. 1.

Referring to FIG. 3, the interfering assembly 70 includes a first interfering member 72, and a second interfering member 74 engagable with and rotatable relative to the first interfering member 72.

The first interfering member 72 is generally cylindrical, defining a through hole 722 for rotatably receiving the post 12. An inserting pillar 724 is formed on a circumference of the first interfering member 72, for being inserted into the positioning hole 29 to fix the first interfering member 72 to the rack 20. The first interfering member 72 includes a first end surface 726 facing the second interfering member 74. A groove 730 is defined in the first end surface 726 around the through hole 722. A first tab 732 is formed on the first end surface 726, between opposite ends of the groove 730. Opposite ends of the first tab 732 form two slope surfaces 734 connecting a bottom of the groove 730 and the first end surface 726. A second tab 728 is protruded from the first end surface 726 opposite to the first tab 732 and adjacent to the circumference of the first interfering member 72. Opposite ends of the second tab 728 form two slope surfaces 729, connecting the first end surface 726 and a top of the second tab 728.

The second interfering member 74 is generally cylindrical, defining a double-D shaped through hole 742, to snugly fit about the post 12. A plurality of wedges 7422 are formed in a sidewall bounding the through hole 742, for firmly mounting the second interfering member 74 on the post 12. The second interfering member 74 includes a second end surface 746 facing the first interfering member 72. A protrusion 750 is protruded on the second end surface 746 around the through hole 742, for being positioned in the groove 730 of the first interfering member 72. A first recess 752 is defined in the second end surface 746, between opposite ends of the protrusion 750, for receiving the first tab 732 of the first interfering member 72. Opposite ends of the first recess 752 form two slope surfaces 754, connecting a bottom of the first recess 752 and the corresponding end of the protrusion 750. The second end surface 746 defines a second recess 748 opposite to the first recess 752 adjacent to a circumference of the second interfering member 74, corresponding to the second tab 728 of the first interfering member 72. Opposite ends of the second recess 748 form two slope surfaces 749, connecting a bottom of the second recess 748 and the second end surface 746.

Referring to FIGS. 1 and 2 again, the resilient assembly 50 for packing the first interfering member 72 and the second interfering member 74 together, includes a plurality of resilient pieces, each of which defines a round through hole for rotatably receiving the post 12. These resilient pieces are stacked together on the post 12. In an alternative embodiment, the resilient assembly 50 can be comprised of springs or other type of resilient components.

In the illustrated embodiment, the fastener 60 is a nut, and can be screwed on the threaded portion of the post 12.

Referring to FIGS. 1 through 4, in assembly, the post 12 of the shaft 10 is inserted through the through hole 31 of a first washer 30, the through hole 41 of a friction piece 40, the pivoting hole 24 of the rack 20, the through hole 41 of the other friction piece 40, the through hole 31 of a second washer 30, the through hole 722 of the first interfering member 72, the through hole 742 of the second interfering member 74, the resilient assembly 50, and the through hole 31 of a third washer 30 orderly, to be screwed to the fastener 60. The blocks 42 of each friction piece 40 are engaged in the corresponding cutouts 28 of the rack 20, to fix the friction piece 40 to the rack 20. The positioning pillar 724 of the first interfering member 72 is inserted into the positioning hole 29 of the rack 20, to mount the first interfering member 72 to the rack 20.

In use, a part of the collapsible device rotates with respect to the other part of the collapsible device to close the collapsible device. The shaft 10 rotates in the pivoting hole 24 of the rack 20. The second interfering member 74 rotates with the shaft 10. When the slope surfaces 729 of the first interfering member 72 engage with the corresponding slope surfaces 749 of the second interfering member 74, and the slope surfaces 734 of the first interfering member 72 engage with the corresponding slope surfaces 754 of the second interfering member 74, the first tab 732 and the second tab 728 slide into the first recess 752 and the second recess 748 respectively and automatically by guidance of these slope surfaces 729, 749, 734, and 754. Thereby, the collapsible device is completely closed automatically.

While several embodiments have been disclosed, it is understood that any element disclosed in any one embodiment is easily adapted to other embodiments. It is also to be understood, however, that even though numerous characteristics and advantages of the disclosure have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
a rack;
a shaft capable of rotating with respect to the rack; and
an interfering assembly mounted on the shaft, the interfering assembly comprising a first interfering member fixed to the rack, and a second interfering member defining a through hole for snugly fitting about the shaft, wherein at least one wedge is formed in a sidewall bounding the through hole of the second interfering member, for firmly mounting the second interfering member on the shaft;
wherein the first interfering member comprises a first end surface facing the second interfering member, a first tab is formed on the first end surface, each of two opposite ends of the first tab forms a first slope surface connecting a top of the tab and the first end surface, wherein the second interfering member comprises a second end surface facing the first interfering member, a first recess is defined in the second end surface for receiving the first tab therein, each of two opposite ends of the recess forms a second slope surface connecting a bottom of the recess and the second end surface;
wherein when the shaft rotates with respect to the rack, one of the first slope surfaces of the first tab is able to engage with a corresponding one of the two the second slope surfaces of the first recess to guide the first tab sliding into the first recess.

2. The hinge of claim 1, wherein a groove is defined in the first end surface, a second tab is formed on the first end surface, between opposite ends of the groove; a protrusion is protruded on the second end surface for being positioned in the groove, and a second recess is defined in the second end surface, between opposite ends of the protrusion, for receiving the second tab of the first interfering member.

3. The hinge of claim 2, wherein the first interfering member defines a through hole for rotatably receiving the shaft therein, the groove is around the through hole of the first interfering member, the protrusion is located around the through hole of the second interfering member.

4. The hinge of claim 2, wherein each of two opposite ends of the second tab forms a third slope surface connecting a bottom of the groove and the first end surface, each of two opposite ends of the second recess forms a fourth slope surface connecting a bottom of the second recess and the corresponding end of the protrusion; each third slope surface of the second tab and a corresponding one of the fourth slope surfaces of the second recess are able to engage with each other to guide the second tab sliding into the second recess.

5. The hinge of claim 1, wherein the rack defines a positioning hole, and an inserting pillar is formed on a circumference of the first interfering member, for being inserted into the positioning hole to mount the first interfering member to the rack.

6. The hinge of claim 1, further comprising at least one friction piece rotatably retained on the shaft, wherein at least one block is formed on a circumference of each of the at least one friction piece, the rack defines at least one receiving room for receiving the at least one friction piece, and at least one cutout for receiving the at least one block.

7. The hinge of claim 6, wherein opposite sides of each of the at least one friction piece define a plurality of receiving holes for retaining lubricant.

8. The hinge of claim 1, further comprising a resilient assembly rotatably retained on the shaft for packing the first interfering member and the second interfering member together.

9. A hinge, comprising:
a rack;
a shaft having a noncircular cross section and capable of rotating with respect to the rack; and
an interfering assembly mounted on the shaft, the interfering assembly comprising a first interfering member fixed to the rack, and a second interfering member defining a through hole for snugly fitting about the shaft, wherein at least one wedge is formed in a sidewall bounding the through hole of the second interfering member, for firmly mounting the second interfering member on the shaft;
wherein the first interfering member comprises a first end surface facing the second interfering member, a groove defined in the first end surface, a first tab formed on the first end surface, between opposite ends of the groove, each of two opposite ends of the first tab forms a first slope surface connecting a bottom of the groove and the first end surface;

wherein the second interfering member comprises a second end surface facing the first interfering member, a protrusion protruded on the second end surface for being positioned in the groove of the first interfering member, a first recess defined in the second end surface, between opposite ends of the protrusion, for receiving the first tab of the first interfering member, each of two opposite ends of the first recess forms a second slope surface connecting a bottom of the second end surface and the corresponding end of the protrusion;

wherein the shaft rotates with respect to the rack, the first slope surface of the first tab engages with the second slope surface of the second recess to guide the first tab sliding into the first recess.

10. The hinge of claim 9, wherein the first interfering member defines a through hole for rotatably receiving the shaft therein, the groove is around the through hole of the first interfering member, the protrusion is located around the through hole of the second interfering member.

11. The hinge of claim 9, wherein the rack defines a positioning hole, and an inserting pillar is formed on a circumference of the first interfering member, for being inserted into the positioning hole to mount the first interfering member to the rack.

12. The hinge of claim 9, further comprising at least one friction piece rotatably retained on the shaft, wherein at least one block is formed on a circumference of each of the at least one friction piece, the rack defines at least one receiving room for receiving the at least one friction piece, and at least one cutout for receiving the at least one block.

13. The hinge of claim 12, wherein opposite sides of each friction piece define a plurality of receiving holes for retaining lubricant.

14. The hinge of claim 9, further comprising a resilient assembly rotatably retained on the shaft for packing the first interfering member and the second interfering member together.

15. A collapsible device comprising:
a first cover;
and a second cover; and
a hinge rotatably connecting the first cover and the second cover, the hinge comprising:
a rack fixed with the first cover;
a shaft, fixed on the second cover, capable of rotating with respect to the rack;
an interfering assembly mounted on the shaft, the interfering assembly comprising a first interfering member fixed to the rack, and a second interfering member defining a through hole for snugly fitting about the shaft, wherein at least one wedge is formed in a sidewall bounding the through hole of the second interfering member, for firmly mounting the second interfering member on the shaft;
a resilient member; and
a fastener capable of fastening the interference assembly and the resilient member on the shaft such that the resilient member biases against the interference assembly to keep the two interfering members engaged each other, wherein the first interfering member comprises a first end surface facing the second interfering member, a first tab is formed on the first end surface, each of two opposite ends of the first tab forms a first slope surface connecting a top of the tab and the first end surface, wherein the second interfering member comprises a second end surface facing the first interfering member, a first recess is defined in the second end surface for receiving the first tab therein, each of two opposite ends of the recess forms a second slope surface connecting a bottom of the recess and the second end surface;

wherein when the shaft rotates with respect to the rack, one of the first slope surfaces of the first tab is able to engage with a corresponding one of the two the second slope surfaces of the first recess to guide the first tab sliding into the first recess.

16. The collapsible device of claim 15, further comprising two friction pieces rotatably retained on the shaft beside of the rack, wherein at least one block is formed on a circumference of each of the friction pieces, the rack defines two receiving rooms in opposite sides for receiving the friction pieces respectively, the rack defines at least one cutout in each of the receiving rooms for receiving the at least one block.

17. The collapsible device of claim 16, further comprising two washers pieces mounted on the shaft, wherein the washers are in tight contacted with one side of the friction pieces away from the rack respectively.

* * * * *